Nov. 30, 1937.      R. M. ROBERTS      2,100,873
DOWEL STRUCTURE
Filed Dec. 28, 1935
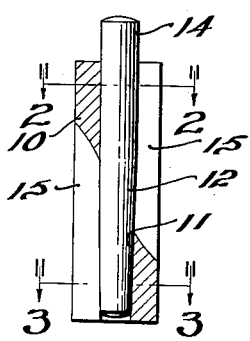
FIG. 1.
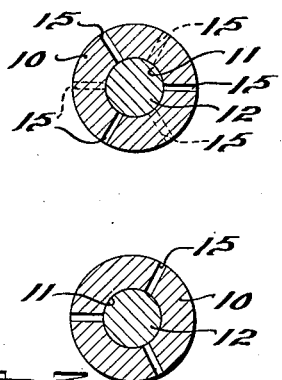
FIG. 2.
FIG. 3.
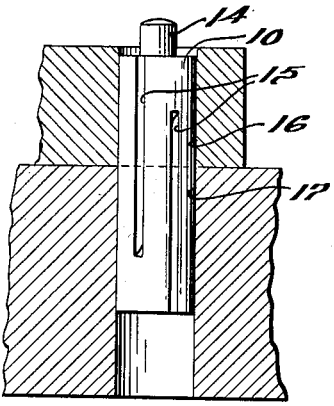
FIG. 4.
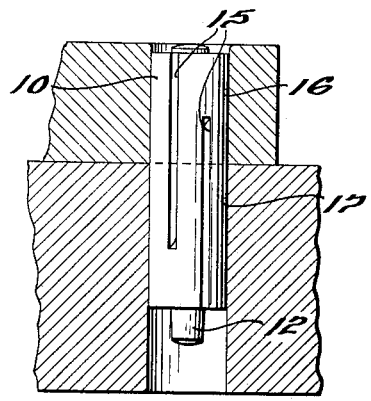
FIG. 5.
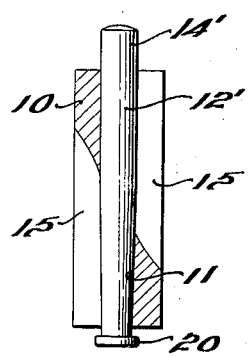
FIG. 6.
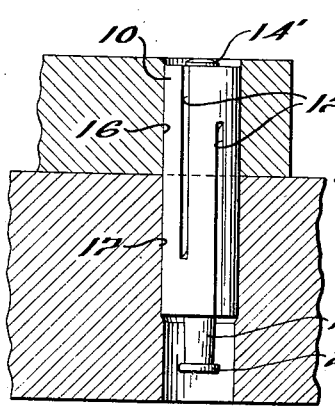
FIG. 7.
INVENTOR.
Russell M. Roberts.
BY
Harness, Dickey, Pierce & Hann.
ATTORNEYS.

Patented Nov. 30, 1937

2,100,873

UNITED STATES PATENT OFFICE 2,100,873

DOWEL STRUCTURE

Russell M. Roberts, Detroit, Mich.

Application December 28, 1935, Serial No. 56,444

3 Claims. (Cl. 85—2.8)

This invention relates to dowels and the like for holding together and in desired alignment parts of tools, fixtures, dies, and special machinery.

In the fabrication of tools and machines of the above character, the part or parts attached to the tool or machines are generally of hard or hardenable material, such as tool steel. These parts have dowel holes drilled and reamed therein or therethrough prior to hardening of the same. After locating such parts of the tools or machine with the required accuracy, dowel holes are spotted, drilled and reamed in the parts to which they are to be attached. In order to maintain attached parts in the desired position, it is important that dowel pins or dowels be pressed in place; however, the fit of such dowels in the openings therefor should be such that the dowels may be driven in by means of a medium weight machinist's hammer. To insure a fit of this kind, a very close relation of diameters of dowel holes and dowels must be maintained, as well as providing smooth, true, hard and aligned surfaces of dowels and dowel openings. This requires the use of a large range of sizes of reamers which must be kept sharp and to size and also requires the exercise of considerable skill and care in accomplishing the desired results.

The parts to be doweled in place are affected during heat treatment for hardening the same so that the dowel holes invariably change in size, opening or closing as much as five thousandths of an inch in many instances. In the case of shrinkage of the openings, it is common practice to remove the excess stock by lapping, which, at best, is a slow and tedious operation. Various types of laps are used to clean out the dowel openings, care being taken to keep the openings straight and of the same diameter throughout their length so that the dowels will make the proper press fit therein. In the event that the dowel openings become enlarged, either through the hardening or the cleaning operations, the only remedy heretofore has been to make a special oversize dowel pin and ream the opening to a correspondingly larger diameter. Hardened and ground dowel pins, though costly in themselves, are preferably employed since they do not have as great a tendency to adhere to the metal into which they are pressed as do soft or unhardened dowel pins. Soft dowels also have a tendency to peen or rivet while being driven, thus making removal extremely difficult or impossible and causing distortion of dowel openings. This prevents proper reassembly and alignment which are often necessary when repairing or replacing a part.

The principal object of this invention is to provide an improved dowel pin construction.

Another object is to provide a dowel construction which obviates the necessity of close alignment or size of dowel pin openings.

Another object is to provide a dowel pin construction which obviates the necessity of accurate cleaning out of dowel openings after hardening attachable parts for a tool or machine.

A further object is to provide an improved self-locking dowel pin.

Another object is to provide a dowel pin construction which is uniformly expandible throughout its entire length and throughout the entire range of its expansion.

A still further object is to provide a dowel construction by which the desired press fit in dowel openings may be readily effected even though considerable variation exists in the diameters of such openings.

Another object is to provide a dowel pin construction which obviates, to a large extent, reaming and lapping operations on hardened metal parts during the preparation of dowel openings.

It is a further object to provide a dowel construction which may be employed in conjunction with hardened metal parts in which dowel openings have become enlarged during hardening of such parts without providing oversize dowels and without recutting the dowel openings to different sizes.

Other objects, features and advantages will become apparent from the following description and appended claims.

For the purpose of illustrating the genus of the invention, reference may be had to the accompanying drawing which shows typical concrete embodiments of this invention, and in which drawing:

Figure 1 is a central vertical section of a dowel construction fabricated according to the principles of this invention;

Figures 2 and 3 are enlarged sections taken substantially on the lines 2—2 and 3—3 of Figure 1;

Figure 4 is a section through portions of a tool or machine showing a step in the application of a dowel thereto, the section being taken centrally of substantially aligned dowel openings in such portions;

Figure 5 is a similar view showing the dowel after setting or locking the same in position;

Figure 6 is a view similar to Figure 1 of a slightly modified form of dowel pin construction; and Figure 7 is a view similar to Figure 5 showing the dowel pin construction of Figure 6 in a set or locked position.

Referring more especially to Figures 1 to 5, inclusive, the numeral 10 indicates a cylindrical body of a dowel pin provided with an axially extended and tapered bore 11. The body 10 is drilled and reamed so that the bore 11 converges in a downward direction as viewed in Figure 1 with a uniform taper of approximately ¼ of an inch per foot, which provides a locking taper. The pin 12 is inserted in the bore 11 and fits therein throughout the length of body 10, the larger end 14 of pin 12 protruding upwardly from the larger end of bore 11, as illustrated in Figure 1. Three or more slots 15 are provided in each end of body 10, each slot extending beyond the center of the body for allowing expansion or contraction of the body as the tapered pin 12 is disposed in the bore 11. The exterior surface of body 10 is preferably ground cylindrical and hardened. The tapered pin 12 is indicative of any expander means for the body 10 and may be in the form of any inclined plane means, such as a wedge, cam, screw, or the like; however, the tapered pin and correspondingly tapered bore construction is preferred, both because of the simplicity of the construction and because the dowel may be operated to locked or unlocked condition simply by use of a hammer or a hammer and rod.

In employing the dowel for the purpose of attaching a part to a tool or machine, the body 10 is inserted into reamed or cleanly drilled holes 16 and 17, as indicated in Figure 3. The pin 12 may be disposed loosely within the bore 11 with the end 14 thereof protruding from the upper end of body 10 as indicated in Figures 1 and 4, or the pin may be inserted into the bore 11 after the body 10 is installed in the openings 16 and 17. The pin 12 is then struck with a hammer in order to lock the dowel in place, which causes the latter to exert extremely high pressures against the walls of the dowel openings 16 and 17 due to the wedging action of pin 12 upon the wall of bore 11. Even though high outward pressures may be exerted by the dowel, there is no tendency on the part of the dowel body 10 to cause adhesion of the metal thereof to the metal into which the body is expanded. In locking the dowel into position, the relative movement occurs between the pin 12 and the dowel body 10, rather than between the dowel body and the parts into which it is contained. In the event that either of the dowel openings 16 or 17 is slightly smaller than the dowel, pressure exerted upon the end of the dowel body will cause it to contract as the dowel is driven into the dowel openings. The dowel is illustrated as in locked condition in Figure 5.

The dowel may be removed by inserting a rod in back of the dowel so as to abut against the lower end of the tapered pin 12 which now protrudes from the dowel body 10 and striking a light blow upon the end of such rod. This releases the pin 12 allowing the dowel body 10 to collapse slightly so that the latter may be readily driven out of the dowel openings 16 and 17. The operation of this type of dowel would be the same for both soft and hardened dowel bodies.

Reference may now be had to Figures 6 and 7 which illustrate a slightly modified form of dowel pin construction. In this form, the dowel body 10 is provided with slots 15 in the manner previously described and tapered dowel pin 12′ cooperates with a correspondingly tapered bore 11 as before. The lower end of pin 12′ is peened over or headed as indicated at 20 to prevent removal of the tapered pin 12′ from the bore 11. When this dowel construction is to be installed, the pin 12′ is arranged in the position indicated in Figure 6 with the head 20 adjacent the near end of the dowel body. Figure 7 illustrates this dowel construction in locked condition in which the upper end 14′ of tapered pin 12′ is nearly flush with the upper end of the dowel body and the headed end 20 spaced from the near end of dowel body 10. The operation of the dowel construction illustrated in Figures 6 and 7 is otherwise the same as that of the embodiment illustrated in Figures 1 to 5, inclusive.

As many changes may be made in the above constructions and many apparently widely different embodiments of this invention may be had without departing from the scope thereof, it is intended that all matter contained in the above description or shown in the accompanying drawing, shall be interpreted as illustrative and not in a limiting sense.

What is claimed is:

1. A dowel pin construction comprising an integral cylindrical body provided with a uniformly tapered bore and a plurality of slots extending completely through the cylinder wall and extending from each end to points beyond the center of said body, the slots extending from one end being circumferentially spaced relative to the slots extending from the other end, and a correspondingly tapered pin receivable in said bore, said pin being of greater length than said cylindrical body.

2. A dowel pin construction comprising an integral cylindrical body provided with a uniformly tapered bore and a plurality of slots extending completely through the cylinder wall and extending from each end to points beyond the center of said body, said slots extending from one end being circumferentially and uniformly spaced relative to the slots extending from the other end, and a corresponding tapered pin receivable in said bore, said pin being of greater length than said cylindrical body.

3. In a dowel pin construction, an integral cylindrical body member provided with a uniformly tapered bore for receiving a correspondingly tapered expander, and a plurality of slots extending completely through the cylinder wall and extending from each end to points beyond the center of said body, said slots extending from one end being circumferentially and uniformly spaced relative to the slots extending from the other end.

RUSSELL M. ROBERTS.